July 14, 1964  V. L. OTT ETAL  3,140,575
CUTTER UNIT FOR ROTARY MOWERS
Filed Dec. 27, 1962
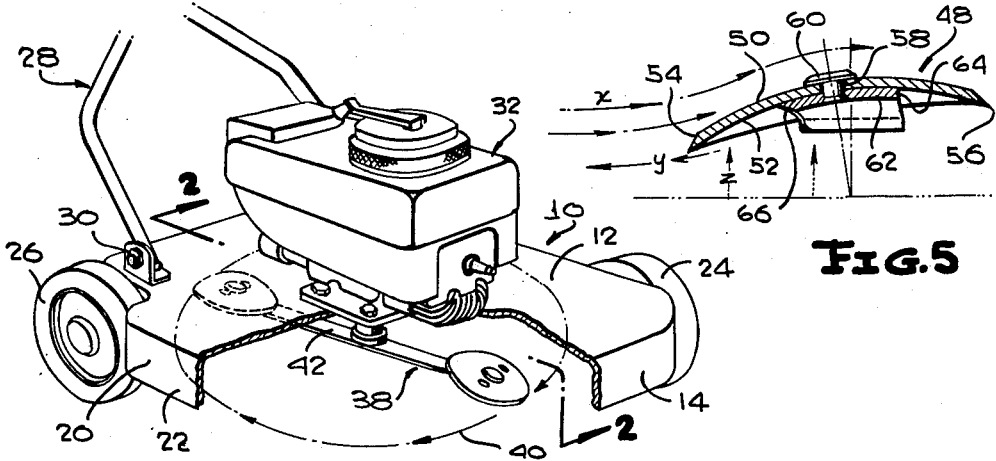
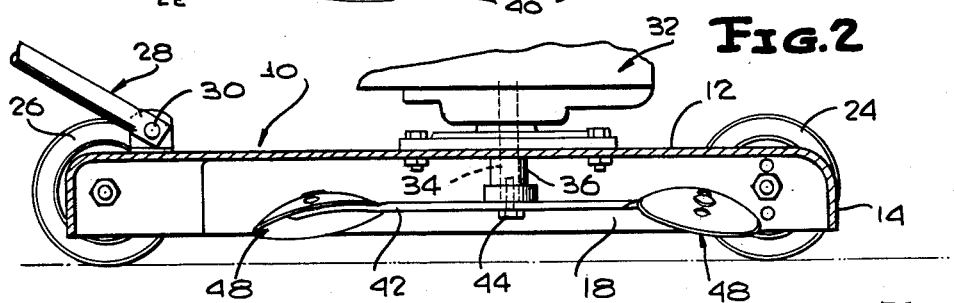
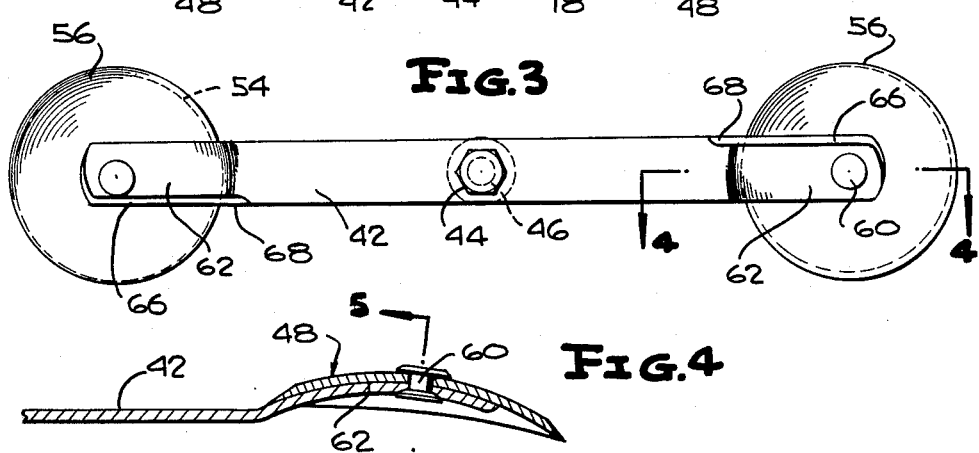
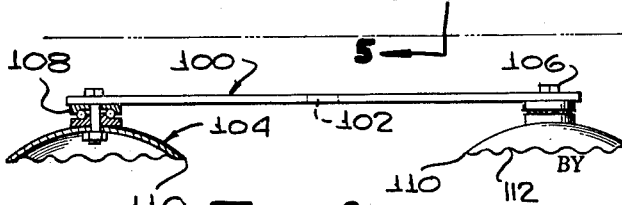
INVENTORS
VIVIAN L. OTT &
JOHN BRANCH BEAMAN Jr.
BY Shoemaker and Mattare
ATTORNEYS

United States Patent Office 3,140,575
Patented July 14, 1964

3,140,575
CUTTER UNIT FOR ROTARY MOWERS
Vivian L. Ott, 61 Sylvan Ave., Norfolk 8, Va., and John Branch Beaman, Jr., 815 Church St., Ahoskie, N.C.
Filed Dec. 27, 1962, Ser. No. 247,578
5 Claims. (Cl. 56—295)

This invention relates generally to the class of mowers or mowing machines and more particularly to machines of the so-called rotary type, and the invention is directed particularly to a new and novel cutter unit for such a machine.

Mowing machines of the rotary type are conventionally designed for mowing residential lawns or part lawns or other small grassed areas and while the new cutting unit of the present invention is primarily intended for use by such machines it is to be understood that it is not restricted to such use.

In rotary type mowers use is made of rigid blades which are secured directly to and extend radially of a rotating power shaft whereby the blades turn or rotate in a horizontal plane.

In such conventional types of rotary mowers where the rigid cutter blades are swung or rotated around a vertical axis, accidents are of frequent occurrence resulting from the rotating blade coming loose and being thrown in a manner to strike and injure the user of the machine or the rotating blade may strike some hard object such as a stone, piece of metal or some other object lying in the grass which either causes the blade to be broken so that a portion of the blade will fly off or the object itself may be violently projected in such a way as to strike the user of the machine.

The present invention is directed to a new type of cutter unit which, while it is revolved in a horizontal plane around a vertical axis, embodies independently rotatable cutting elements which move in a circular path and which have a rolling cutting action, as a result of which the entire cutter unit may be rotated about a vertical center at a much slower speed than conventional rigid blade cutters and at the same time maintain a high degree of cutting efficiency equal to that of the more rapidly rotated rigid cutter blades.

Another object of the invention is to provide a new rotary cutter unit designed to be rotated in a substantially horizontal plane on a vertical axis and carrying peripherally sharpened cutting discs which are independently supported for rotation while moving in a circular path around the center of rotation for the entire unit.

Still another object of the invention is to provide a rotary cutter unit embodying a bar member and peripherally sharpened cutting discs supported upon the ends of the bar member for rotation relative to the bar member, with means for attaching the bar member mid-way of its ends to a vertically disposed power shaft whereby the independently rotatable cutting discs are moved in a circular path and are free to rotate on the supporting bar as the cutting edges thereof contact vegetation to be cut and the rotatable mounting for the cutting discs permitting the discs to roll with respect to any hard object which may be encountered thereby protecting the cutter from damage and also eliminating the possibility of such hard object, if movable, being thrown outwardly to cause injury to the mower operator.

Still another object of the invention is to provide a cutter unit embodying cutting discs mounted in the manner hereinabove described, wherein such cutting discs are maintained on the supporting carrier member or bar at such an angle with respect to the bar that when the cutter unit is attached to a vertical power shaft to rotate the unit in a substantially horizontal plane the periphery of each cutter disc will be disposed in a plane having a downward inclination in the direction or movement of the disc and also tilted slightly downwardly in a radial outward direction with respect to the center of rotation of the disc whereby a highly efficient cutting action results.

More specifically the cutter unit of the present invention embodies a mounting bar having supported upon each end thereof a dished or concave disc pivotally attached to the supporting bar for rotation on its radial center, with the concave side of the disc being directed downwardly whereby upon rotation of the unit in a substantially horizontal plane the discs upon the ends of the mounting bar will function to create a slight updraft of air which will produce a more efficient cutting action of the sharpened periphery of the disc by tending to lift the blades of grass.

The invention will be best understood from the consideration of the following detailed description taken in connection with the accompanying drawing forming a part of the specification, wherein:

FIG. 1 is a view in perspective of a mower having a wheel supported body and engine mounted thereon, of conventional design, with a portion of the mower body broken away to show a cutter unit constructed in accordance with one embodiment of the present invention.

FIG. 2 is a sectional view taken substantially on the line 2—2 of FIG. 1 looking in the direction of the arrows and illustrating more clearly the tilted or inclined disposition of the rotary dished cutting discs on the ends of the supporting bar and showing the advancing edge portion of the discs at a lower elevation than the trailing edge thereof.

FIG. 3 is a bottom plan view of the cutter units shown in FIGS. 1 and 2 and illustrating one manner of mounting the cutting discs whereby they will be tilted in the proper directions on the supporting bar by slightly tortionally twisting the outer end portions of the bar and also illustrating the sharpened forward or advancing edge portion of the bar.

FIG. 4 is a sectional view on an enlarged scale, taken substantially on the lines 4—4 of FIG. 3 and showing the downward and radially outward inclination of the cutter disc.

FIG. 5 is a sectional view taken substantially on the line 5—5 of FIG. 4 and illustrating the downward and forward inclination of the cutter disc.

FIG. 6 is a view partly in side elevation and partly in section of another embodiment of the cutter unit in which the cutter discs are disposed beneath the outer ends of the support bar with the bar attached to the convex side of each disc.

Referring now more particularly to the drawings, numeral 10 generally designates a conventional type of rotary mower housing or body which is here illustrated as being of substantially square configuration and comprising the top wall 12 formed integrally with downwardly projecting bordering front, rear and side flanges or walls, the front and rear flanges or walls being designated 14 and 16 respectively, while the side walls are designated 18 and 20. Thus there is formed a downwardly opening housing body and one of the side walls, here shown as the side wall or flange 20, is formed with a grass discharge outlet 22.

Suitable means is provided for mounting supporting wheels 24 at the front of the structure, one only of which wheels is here illustrated, and rear wheels 26.

The numeral 28 generally designates a handle pivotally connected with the body as indicated at 30, adjacent to the rear of the machine.

The top 12 of the housnig has mounted on the center thereof a suitable prime mover generally designated 32 and here shown as a gasoline motor, from which there extends downwardly the power shaft 34, through a suitable bearing 36 fixed to the underside of the wall 12.

The structure thus far described is more-or-less conventional and in its detail forms no part of the present invention but the illustration is given for the purpose of showing a suitable operative mounting for the cutter unit which comprises the invention. Also it will be understood that while a prime mover of the internal combustion engine or gasoline type has been illustrated and referred to, any other suitable type of prime mover may be employed for driving the cutter unit.

The cutter unit in one embodiment thereof is generally designated 38 and is illustrated in FIGS. 1 and 2 attached to the lower end of the vertically disposed power shaft 34 to be rotated in a horizontal plane beneath the housing top 12 and within the area bordered or defined by the depending flanges or walls of the housing. The circular broken line and arrow 40 designates the direction of clockwise rotation of the cutter unit 38, of the form illustrated. The cutting elements of the unit have a set position for operation or cutting action when rotated in a clockwise direction as indicated. If rotation in a counter clockwise direction is desired the cutting elements would have an opposite setting for carrying out the cutting operation as will become apparent from the following description.

The cutter unit 38 comprises a bar 42 of suitable length to rotate in a horizontal plane within the housing 10. Means is provided for securing the bar mid-way between its ends, to the lower end of the power shaft 34, such means here being illustrated as a cap screw 44 having the shank thereof extended through an aperture 46 in the bar 42. Any other suitable means may, however, be employed for attaching the bar to the shaft.

Each end of the bar 42 has rotatably mounted thereon, a cutter disc which is generally designated 48. This unit in the form of a disc is dished or of concavo-convex form the convex side being designated 50 while the concave side is designated 52, which sides or surfaces are parallel as shown.

The periphery of the disc is ground off from the top or convex side as indicated at 54 whereby the ground surface or portion 54 intersects the concave surface to form the cutting edge 56 which is downwardly directed when the disc is mounted for cutting action.

Each cutting disc or disc unit has a central aperture 58 and when the disc is mounted in position upon the top of the carrier or support bar 42 a rivet 60 passing through the aperture 58 and through the underlying portion of the bar 42, maintains the disc in position on the end of the bar but permits the free rotation of the disc relative to the bar.

A short longitudinal portion of each end of the bar 42 is tortionally twisted. These tortionally twisted end portions are designated 62 and the twists are opposite one to the other whereby, when the major central portion of the bar is held in a horizontal plane each portion 62 will have a high back or trailing edge, which is designated 64 and a slightly lower forward or advancing edge which is designated 66.

Additionally each of the portions 62 is slightly longitudinally and transversely arcuate, the curvature of the arcs corresponding with the arcuate curvature of the concave or underside of the disc 48 whereby the terminal portion will lie closely against the underside of the disc to which it is attached by the pivot rivet 60 as shown in FIGS. 4 and 5.

The edges 66 of the two portions 62 are also bevelled as illustrated in FIGS. 3 and 5 to form a sharp cutting edge 68.

When the discs 48 are mounted upon the portions 62 of the carrier bar 42 with the concave underside of the disc resting upon the longitudinally and transversely arcuate top surface of the portion 62 the disc will assume an inclination from the horizontal thereby pitching one portion of the sharpened edge 56 downwardly in both the transverse direction and the longitudinal direction of the bar, the longitudinal direction of downward pitch being outwardly or away from the center of rotation of the bar when it is attached to the power shaft 34. Also when it is attached to the power shaft the lowermost cutting edge portion of each disc will be the advancing edge when the cutter unit is rotated as illustrated in FIG. 1. As before stated if the direction of rotation is opposite to that shown in FIG. 1 then the unit would have the cutting disc elements mounted in the reverse direction so that the lowermost portions of the cutting edges would be the advancing edges of the discs, as will be readily understood.

The sharpened edge 68 on the advancing side of each of the portions 62, lying close against the undersurface of the disc 48 to which it is attached prevents the packing or building up of any mass of material along the advancing side or edge of the bar portion 62.

FIG. 6 illustrates another embodiment of the cutter unit wherein the concavo-convex cutting discs are attached to the undersides of the end portions of the carrier bar and are freely rotatable with respect to the carrier bar. In this modified construction of the unit the carrier bar is generally designated 100 and comprises, like the bar 42, a relatively long strip of flat bar material having mid-way between its ends an opening 102 for facilitating the attachment of the bar to the power shaft of the prime mover.

This bar 100 is flat or in a single plane through its length rather than having end portions tortionally twisted as in the first described embodiment and the cutter discs which are attached to the ends of the bar 100 are generally designated 104 and are mounted with their concave sides directed downwardly. The mounting for the discs 104 comprises a suitable pin or bolt 106 extending through the carrier bar and through the center of the disc 104 and through the center of a bearing unit 107 which is interposed between the convex top side of the disc and the under side of the supporting bar. This bearing unit 108 may be of any suitable type but it is preferably of the ball bearing type whereby the cutter disc may turn freely and smoothly in the performance of the cutting operation as it is moved through the circular path by the rotation of the bar in a substantially horizontal plane.

As illustrated the top and bottom surfaces of the cutter discs 104 are parallel and the periphery of the disc is bevelled to form the sharp cutting edge 110.

When the cutter units are rotated by the prime mover to turn the disc carrier base around the center of the power shaft, the cutter discs will follow a circular path as hereinbefore stated and as illustrated in FIG. 1. The advancing edge portions of the discs cut the grass and other material as they contact the same and also the discs are caused to rotate about their centers and consequently a fresh cutting is constantly being brought into cutting position.

In addition to the fact that the discs present a constantly turning or rotating cutting edge to efficiently cut the vegetation, this rolling movement will prevent damage to the blade in the event that it strikes a hard or stationary object and will also prevent any movable objects from being thrown outwardly by the curved or rounded blades which the discs present.

Since the discs are caused to turn upon their own axes in addition to being turned through a circular path, the cutting edges of the discs will not be driven straight against the objects to be cut but will be brought into contact with the same with a rolling or slicing motion. Because of this the cutter units of this invention may be turned at a slower rate than conventional straight cutting blades of rotary mowers are turned, and at the same time mow grass with all of the efficiency of a high speed conventional rotary type mower.

As hereinbefore stated the form of the cutting units or discs is such that when they are moved in the circular path by the supporting or carrier bar 42 or 100, with the concave surfaces of the discs directed downwardly, the air stream flowing over the top surface of the disc as indicated by the arrows $x$ in FIG. 5, when the disc is moving in the direction indicated by the arrow $y$, will bring about a reduced pressure beneath the concave side of the disc and creation of an updraft as indicated by the arrows $z$, tending to lift grass over which the disc is passing and accordingly bringing about a cleaner and more even cutting operation.

While the cutting edge of each of the discs may be in the form of a true circle as the discs 48 are illustrated in FIG. 3, for example, such edge may also be made serrated as indicated at 112 on the discs 104. Such serrated edges provides additional length of cutting edge as will be readily apparent.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

We claim:

1. A cutter unit for a rotary power mower, comprising an elongate bar having top and bottom sides, a pair of cutter disc elements of substantially concavo-convex form and having sharpened circular peripheral cutting edges, each disc element being positioned over the top of one of two end portions of the bar with its concave side directed downwardly, pivot means coupling the center of each disc to said portion of the bar for rotation on an axis which is inclined from the vertical with respect to the top and bottom sides of the bar and toward a longitudinal side of the bar whereby the disc is disposed at an inclination to the top of the bar and said axes further being oppositely inclined with respect to one another, and said bar having opposite longitudinal edges of the said end portions thereof, sharpened to form cutting edges and said cutting edges being on the advancing sides of the bar in the operation of the unit.

2. The invention according to claim 1, wherein the said portion of each end of the bar is longitudinally bowed to substantially conform to the overlying concave side of the disc and said portion of the bar further being tortionally twisted and thereby disposing the pivot means for the rotation of the disc on said inclined axis.

3. The invention according to claim 1, wherein each of the said portions of the bar is longitudinally and transversely bowed to substantially conform to the curvature of the concave side of the overlying disc.

4. The invention according to claim 1, wherein each of the said portions of the bar is longitudinally and transversely bowed to substantially conform to the curvature of the concave side of the overlying disc and each of said portions of the bar is torsionally twisted to thereby dispose the pivot means for the rotation of the disc on said inclined axis.

5. The invention according to claim 1, wherein each of said portions of the bar is longitudinally and transversely bowed to substantially conform to the curvature of the concave side of the overlying disc and the top surface of each bar is positioned with the sharpened cutting edge in substantial contact with the concave surface of the overlying disc to have both a cutting action and prevent an accumulation of cut vegetation against the bar.

References Cited in the file of this patent

UNITED STATES PATENTS

| | | |
|---|---|---|
| 901,605 | Ferriss | Oct. 20, 1908 |
| 2,529,870 | Golasky | Nov. 14, 1950 |
| 2,592,755 | Soenksen | Apr. 15, 1952 |